(12) United States Patent
Sarkar et al.

(10) Patent No.: US 12,517,500 B2
(45) Date of Patent: Jan. 6, 2026

(54) RESILIENCY VERIFICATION OF MODULAR PLANTS

(71) Applicant: ABB Schweiz AG, Baden (CH)

(72) Inventors: Santonu Sarkar, Bangalore (IN);
Mario Hoernicke, Landau (DE);
Nicolai Schoch, Heidelberg (DE);
Katharina Stark, Weinheim (DE)

(73) Assignee: ABB Schweiz AG, Baden (CH)

( * ) Notice: Subject to any disclaimer, the term of this patent is extended or adjusted under 35 U.S.C. 154(b) by 476 days.

(21) Appl. No.: 17/957,133

(22) Filed: Sep. 30, 2022

(65) Prior Publication Data
US 2023/0121753 A1    Apr. 20, 2023

(30) Foreign Application Priority Data

Oct. 1, 2021  (EP) ................................ 21200463

(51) Int. Cl.
    *G05B 19/418*    (2006.01)
(52) U.S. Cl.
    CPC ............ *G05B 19/41835* (2013.01); *G05B 2219/32344* (2013.01)
(58) Field of Classification Search
    CPC .... G05B 19/41835; G05B 2219/32344; G05B 2219/32015; G05B 2219/32128; G05B 19/41885; G05B 19/41865
    See application file for complete search history.

(56) References Cited

U.S. PATENT DOCUMENTS

| | | | | |
|---|---|---|---|---|
| 2003/0004679 A1* | 1/2003 | Tryon, III | ........... | H04L 41/5032 702/182 |
| 2005/0096872 A1* | 5/2005 | Blevins | ................. | G05B 17/02 702/183 |
| 2011/0184689 A1* | 7/2011 | Awedikian | .......... | G06F 11/3684 702/123 |
| 2011/0246831 A1* | 10/2011 | Das | ..................... | G06F 30/3323 714/E11.029 |
| 2013/0159774 A1* | 6/2013 | Budnik | ............... | G06F 11/3688 714/33 |
| 2016/0033952 A1* | 2/2016 | Schroeter | ......... | G05B 19/41885 700/108 |
| 2019/0188584 A1* | 6/2019 | Rao | ........................ | G06Q 10/00 |

(Continued)

FOREIGN PATENT DOCUMENTS

EP            3608741 A1    2/2020
WO   WO-2017115162 A1 *  7/2017

OTHER PUBLICATIONS

Alur et al., "Model Checking of Hierarchical State Machines," *ACM Transactions on Programming Languages and Systems (TOPLAS)*, 23(3): 273-303 (May 2001).

(Continued)

*Primary Examiner* — Christopher E. Everett
(74) *Attorney, Agent, or Firm* — Fitch Even Tabin & Flannery LLP

(57) ABSTRACT

A method for verifying process orchestration logic for a modular plant includes generating a plant execution model representing the process orchestration logic; analyzing the plant execution model to identify one or more potential failure scenarios; and generating one or more test cases based on the one or more identified failure scenarios.

12 Claims, 15 Drawing Sheets

(56) References Cited

U.S. PATENT DOCUMENTS

2021/0397146 A1* 12/2021 Halblaub ......... G05B 19/41885

OTHER PUBLICATIONS

Bloch et al., "Modelling of service dependencies in modular process plants for the analysis of orchestrations," 2021 *26th IEEE International Conference on Emerging Technologies and Factory Automation (ETFA)*, IEEE, 4 pp. (Sep. 7-10, 2021).
Deliverable D1, "Avanti—Test methodology for virtual commissioning based on behaviour simulation of production systems," *Information Technology for European Advancement ITEA 2*—12036, 1: 50 pp. (Apr. 30, 2014), downloaded from the Internet at http://www.avanti-project.de/files/AVANTI_D11_State_of_the Art_public.pdf on Mar. 27, 2015.
Morozov et al., "Dual Graph Error Propagation Model for Mechatronic System Analysis," *IFAC Proceedings* vols. 44(1): 9893-9898 (Jan. 2011).
Quan et al., "IMA Reconfiguration Modeling and Reliability Analysis based on AADL," *The 4th Annual IEEE International Conference on Cyber Technology in Automation, Control and Intelligent Systems*, IEEE, 664-668 (Jun. 4-7, 2014).
Wang et al., "Reliability Analysis of the Integrated Modular Avionics System Using AADL and GSPN," *15th AIAA Aviation Technology, Integration, and Operations Conference*, 13 pp. (Jun. 22-26, 2015).
Wei et al., "Safety Analysis of AADL Models for Grid Cyber-Physical Systems via Model Checking of Stochastic Games," *electronics*, 8(2): 212, 20 pp. (Feb. 14, 2019).
European Patent Office, Extended European Search Report in European Patent Application No. 21200463.4, 9 pp. (Apr. 14, 2022).

* cited by examiner

RESILIENCY VERIFICATION OF MODULAR PLANTS

CROSS-REFERENCE TO RELATED APPLICATIONS

This patent application claims priority to European Patent Application No. 21200463.4, filed on Oct. 1, 2021, which is incorporated herein in its entirety by reference.

FIELD OF THE DISCLOSURE

The present disclosure relates to methods and systems for verifying process orchestration logic for modular plants.

BACKGROUND OF THE INVENTION

Modular plants are designed during an engineering phase by integrating a set of predesigned modules into a plant topology and defining orchestration logic that coordinates the modules. Each module is represented by a Module Type Package (MTP), which is a standardized data package containing all necessary information to integrate the module into a modular plant, such as the communication, the services (i.e., the functions performed by the module), a human machine interface (HMI) description, and maintenance information. Modules may be integrated by selecting an MTP and connecting the input and/or outputs of the module (as defined in the HMI section of the MTP) with those of one or more other modules in the topology. The orchestration logic is designed to invoke the services provided by the modules (as defined in the service sections of the MTPs).

Integration testing of the designed topology to verify the orchestration logic can present challenges. Although the individual modules themselves may be well-tested, integration of a set of modules can be vulnerable to unforeseen scenarios which can result in costly debugging during testing or system failure following commissioning. Debugging the cause of failure can be difficult, especially when service implementation details are not available to the engineer, as is the case with third party MTPs, which define only the service APIs. Assumptions must therefore be made, such that the outcome is highly dependent on the expertise of the engineering team.

BRIEF SUMMARY OF THE INVENTION

It would therefore be desirable to provide methods and systems enabling more effective verification of verification of modular plant designs prior to commissioning. Accordingly, in a first aspect of invention, there is provided a method for verifying process orchestration logic for a modular plant, the method comprising:
  generating a plant execution model representing the process orchestration logic;
  analyzing the plant execution model to identify one or more potential failure scenarios; and
  generating one or more test cases based on the one or more identified failure scenarios.

Generating the plant execution model may comprise obtaining service execution models for respective services referenced in the process verification logic, and modelling communications between the services based on the process orchestration logic. Obtaining the service execution models may comprise generating the service execution models based on data defining the modular plant. The data defining the modular plant may comprise module specifications, e.g., MTPs, for the modules whose services are to be modelled. Generating the service execution models may comprise modifying at least one template service execution model based on the data defining the modular plant. Modifying the template service execution model may comprise modifying state transition conditions in the template service execution model, optionally while retaining the structure of the template.

Modifying the template service execution model may comprise modifying events referred to in the template based on the data defining the modular plant. Modelling communications between the services may comprise modelling one or more of material flow and information flow between the services, e.g., between the modules which provide those services. Modelling material flow and/or information flow may comprise using one or more mapping functions to identify material flow and/or information flow in data defining the plant topology. One or more mapping functions may be based on a flow-map. Identifying material flow may comprise identifying connections between sink objects and source objects in the data defining the plant topology.

Identifying information flow may comprise identifying connections between output and input of process values in the process orchestration logic. Generating the plant execution model may comprise using model elements to represent service invocations identified in the process orchestration logic, and expanding those elements to include the service execution models for the corresponding services. The plant execution model may comprise a hierarchical plant execution model, in which an upper hierarchy represents the process orchestration logic and a lower hierarchy represents service execution. The upper hierarchy may be obtained or derived from the process orchestration logic, and the lower hierarchy may comprise the service execution models. Generating the plant execution model may comprise a multistage process in which a main sequence is modelled in one stage and one or more sub-sequences are modelled in one or more other stages. The plant execution model and/or the service execution models may be implemented using one or more of: state machines; petrinets; stochastic petrinets; stochastic activity networks; or any combination thereof.

Analyzing the plant execution model may comprise performing one or more error propagation analysis techniques. Performing one or more error propagation analysis techniques may comprise identifying one or more error propagation paths. Performing one or more error propagation analysis techniques may comprise performing material error propagation analysis and/or information error propagation analysis. Analyzing the plant execution model may be performed with reference to an error model comprising one or more predefined error types. Analyzing the plant execution model may comprise modelling one or more predetermined error propagation paths and identifying one or more of the predetermined error propagations paths in the plant execution model. The predetermined error propagation paths may be modelled at least partially based on the error model. Analyzing the plant execution model may comprise performing one or more execution flow analysis techniques. Performing one or more execution flow analysis techniques may comprise identifying one or more reachable and/or unreachable states. Analyzing the plant execution model may comprise generating an analysis report detailing the identified failure scenarios.

Generating one or more test cases may comprise generating a said test case for each of the one or more identified failure scenarios, for example for each identified error propagation path. The method may further comprise automatically executing at least one of the one or more generated test cases to test and verify the performance of the process orchestration logic.

According to the present disclosure, plant functionality may readily be modelled as a collection of communicating service models (e.g. state machines), without internal details concerning module implementation being necessary. Modelling of services as a state machine may be performed in compliance with the VDI-2658 service specification. Using the systems and methods described herein: developer productivity may be improved (improved error detection during the early engineering phase reduces the integration and testing effort); modular plants can be designed with a faster turnaround time from scratch; overall reusability of existing modules may be improved, in turn enriching the module ecosystem; overall interoperability and standardization may be improved.

The method of the first aspect may be computer implemented.

According to a second aspect, there is provided a method for generating control code for a modular plant, the method comprising performing the method of the first aspect to verify process orchestration logic for the modular plant, and generating the control code from the verified process orchestration logic. Techniques for generating control code from control logic are known in the art.

According to a third aspect, there is provided a method of operating a modular plant, the method comprising controlling the modular plant, using control code generated using the method of the second aspect, to carry out an industrial process defined by the process orchestration logic for manufacturing a product.

According to a fourth aspect, there is provided a computing device comprising a processor configured to perform the method of any of the first-third aspects.

According to a third aspect, there is provided a computer program product comprising instructions which, when executed by a computing device, enable or cause the computing device to perform the method of any of the first-third aspects.

According to a sixth aspect, there is provided a computer-readable medium comprising instructions which, when executed by a computing device, enable or cause the computing device to perform the method of any of the first-third aspects.

The invention may include one or more aspects, examples or features in isolation or combination whether or not specifically disclosed in that combination or in isolation. Any optional feature or sub-aspect of one of the above aspects applies as appropriate to any of the other aspects.

These and other aspects of the invention will be apparent from and elucidated with reference to the embodiments described hereinafter.

BRIEF DESCRIPTION OF THE SEVERAL VIEWS OF THE DRAWING(S)

Figure 5:
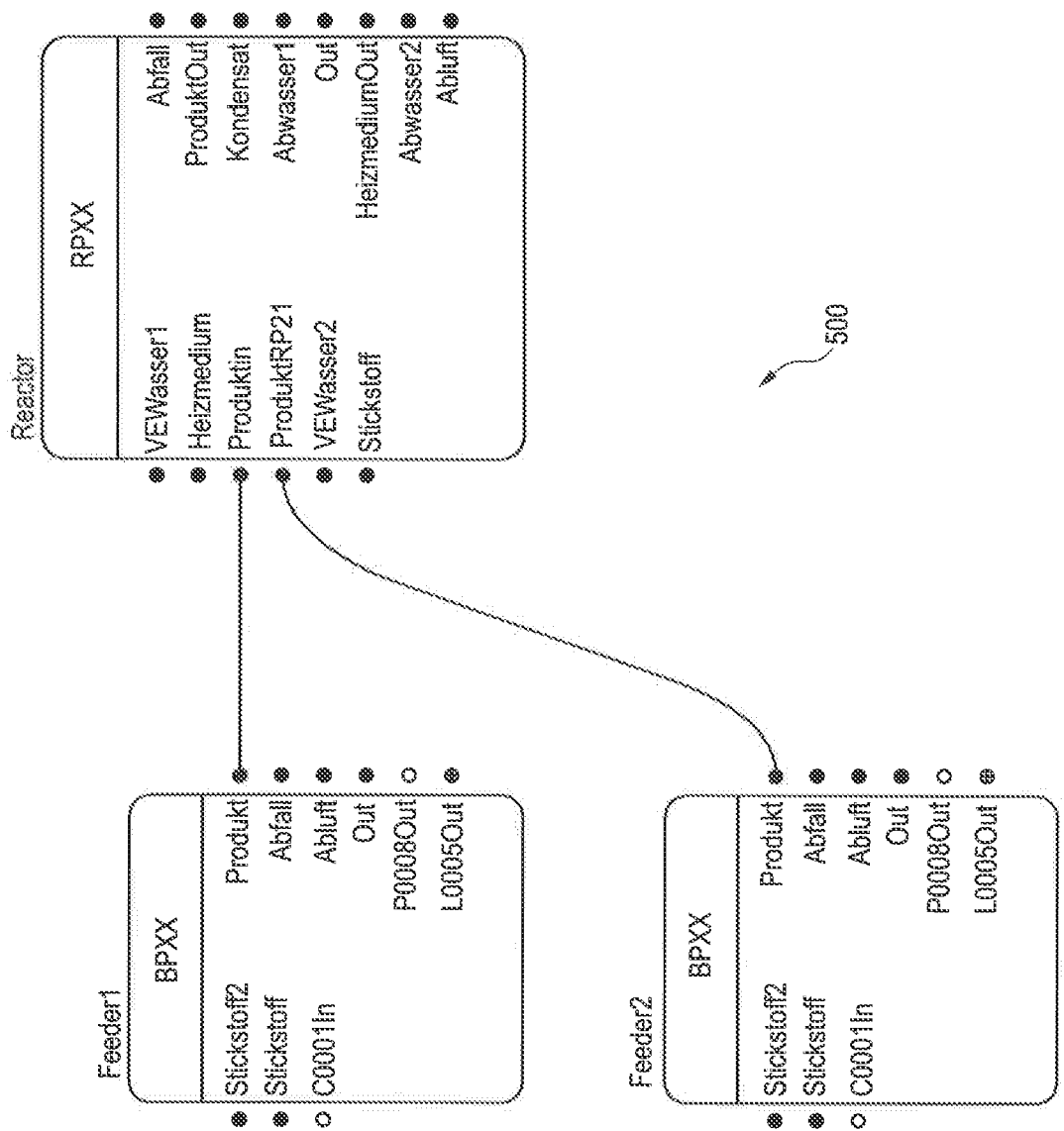
FIG. 5 is a diagram of a modular plant consisting of three modules, in accordance with the disclosure.
Figure 8A:
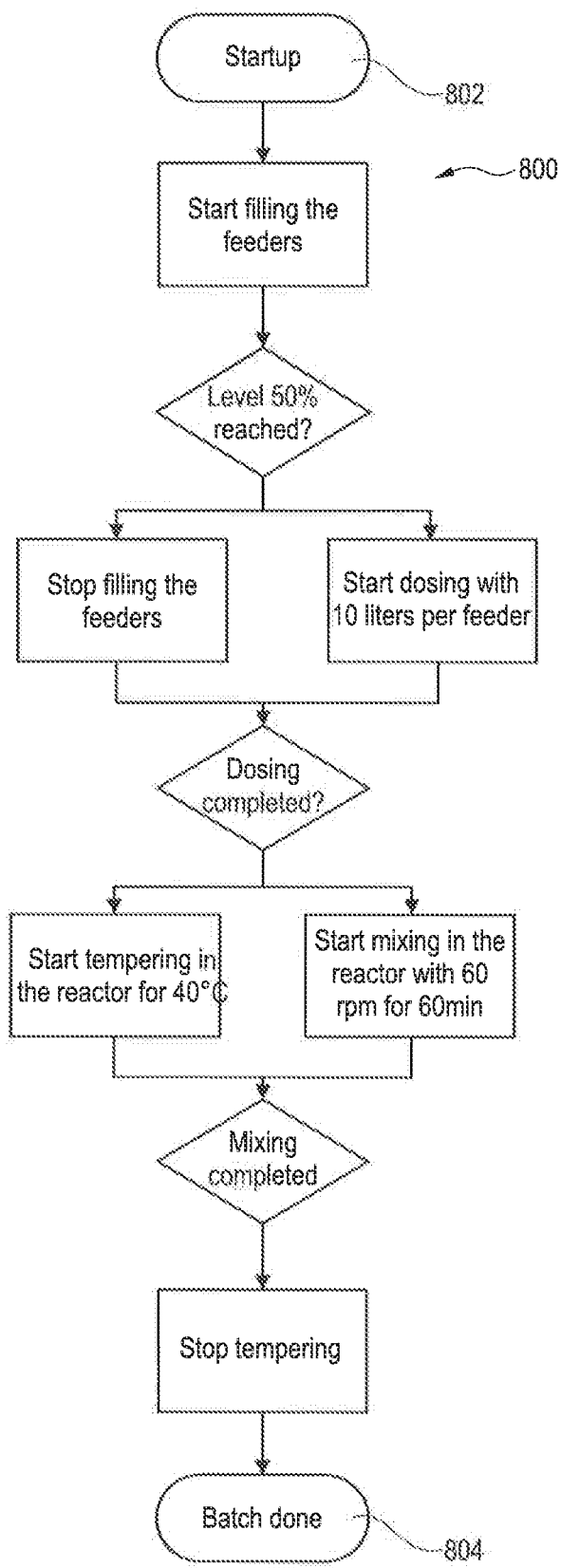
Figure 8C:
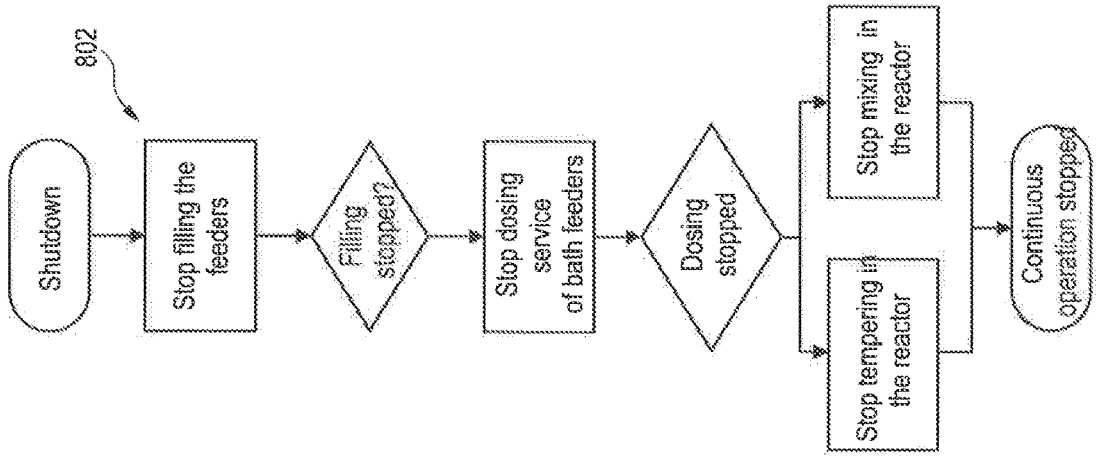
Figure 8B:
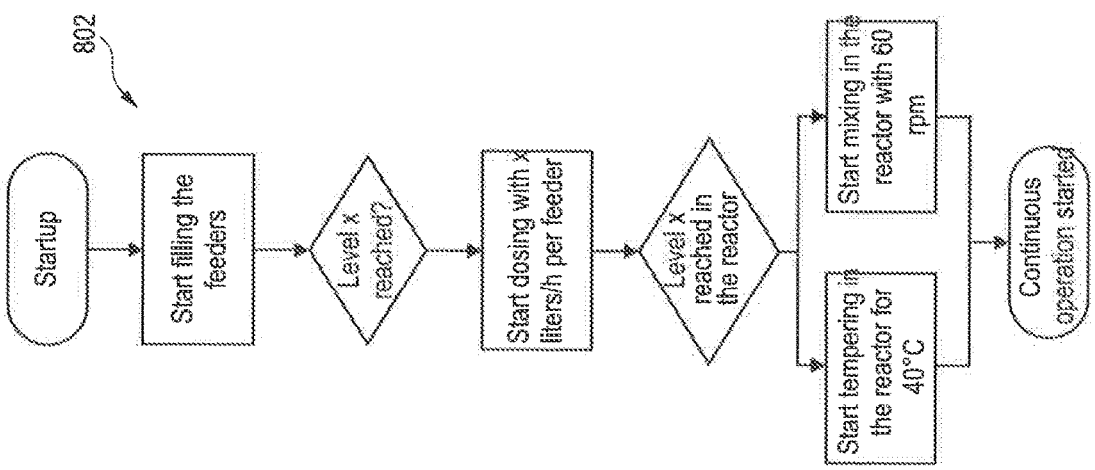

FIGS. 8A, 8B, and 8C illustrate exemplary operating sequences for the modular plant of FIG. 5.

Figure 9:
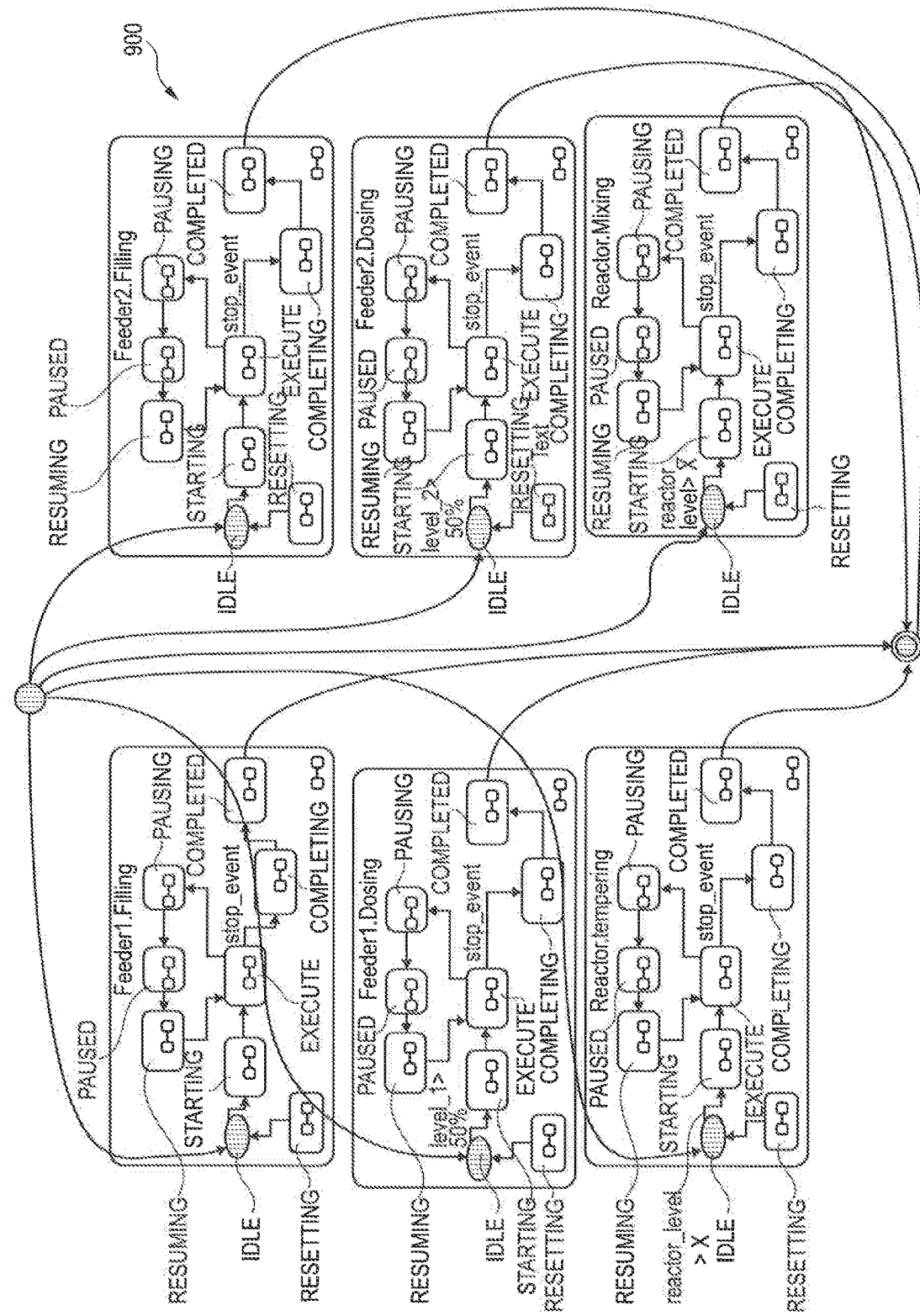

FIG. 9 is a diagram of a state machine-based plant execution model for the sequences of FIGS. 8A, 8B, and 8C.

Figure 10:
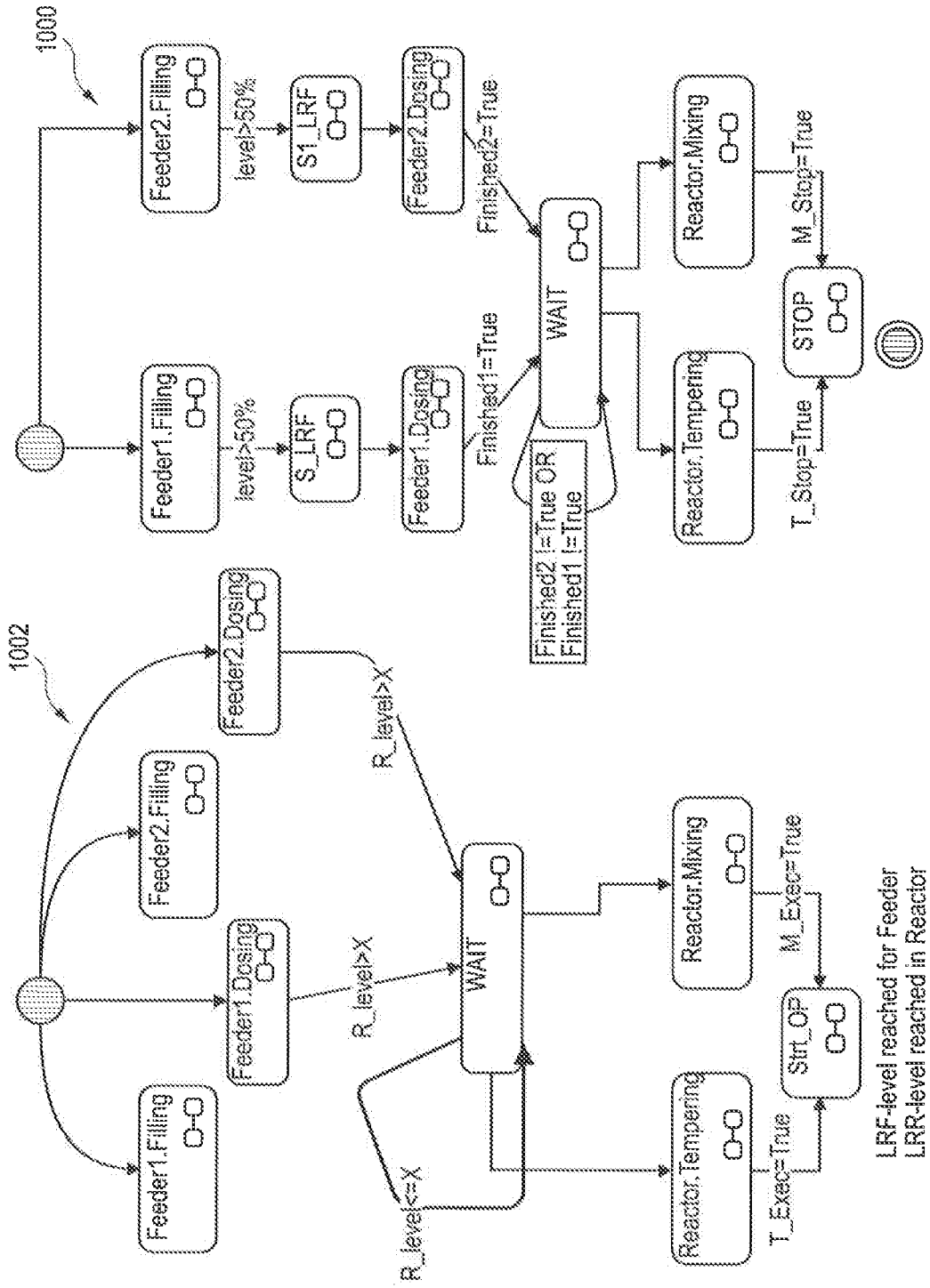

FIGS. 10A and 10B are diagrams of state machines representing process orchestration logic for the sequences of FIGS. 8A and 8B, respectively.

Figure 11:
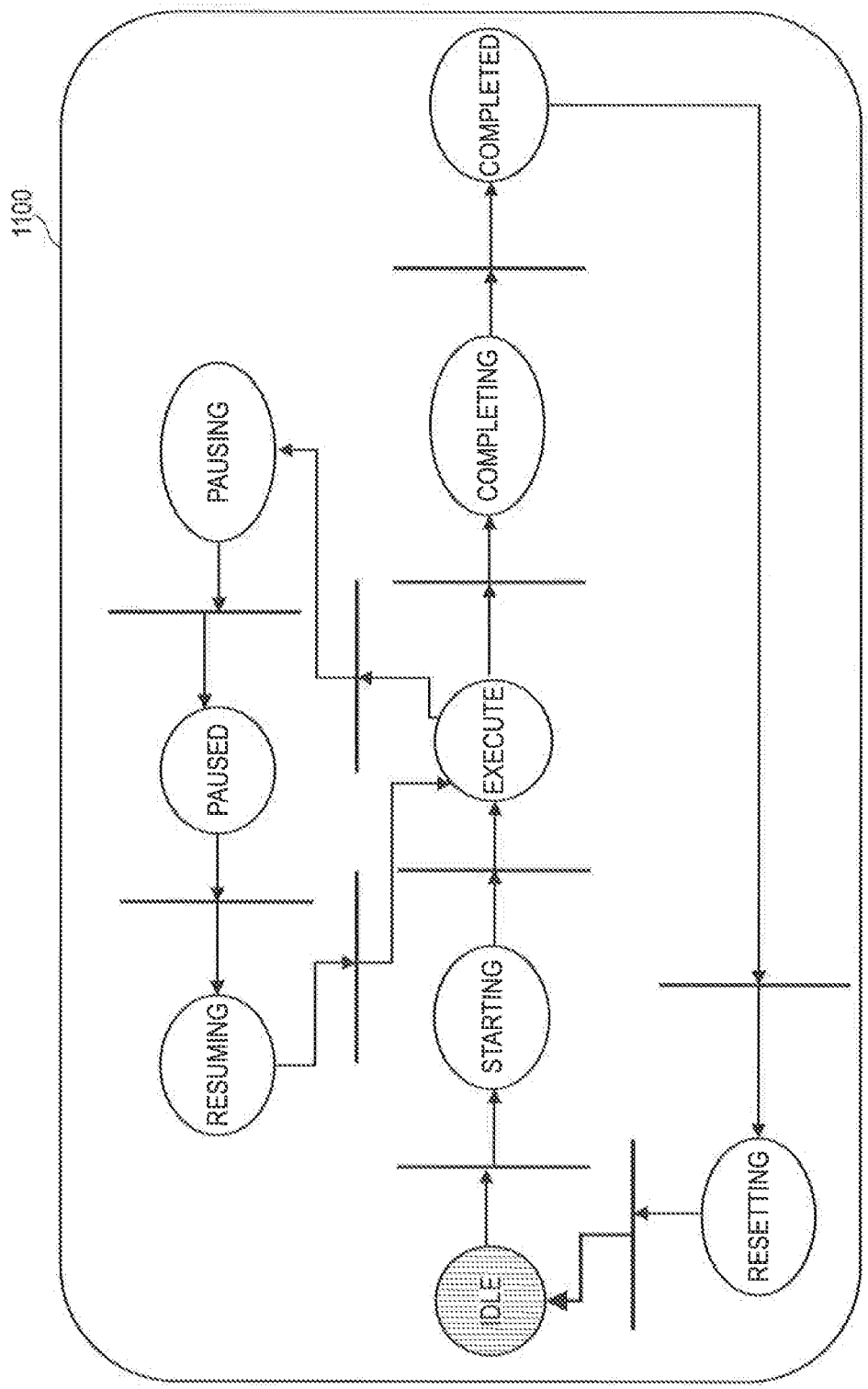

FIG. 11 is a diagram of a petrinet-based template for modelling a module service in accordance with the disclosure.

Figure 12:
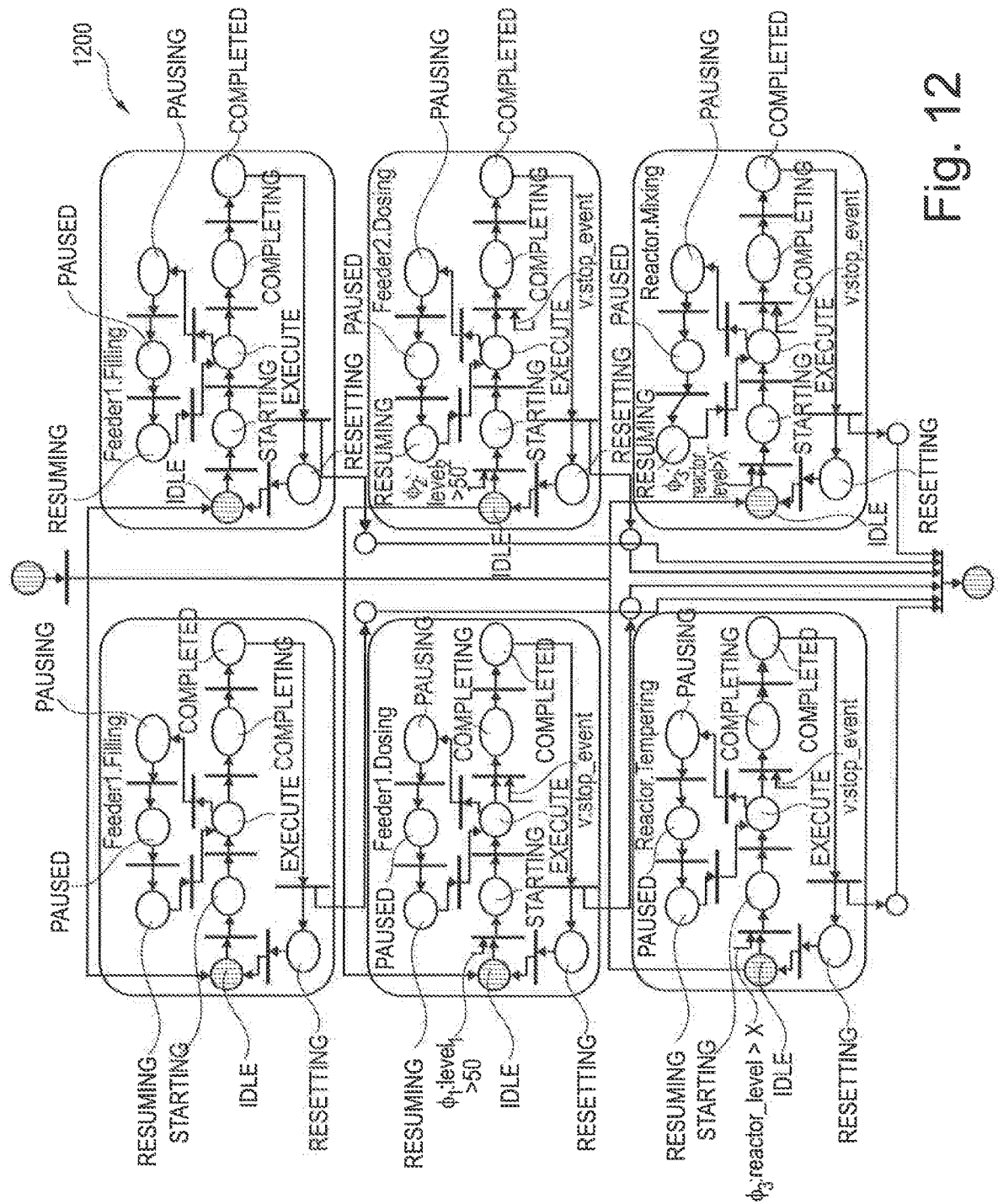

FIG. 12 is a diagram of a petrinet-based plant execution model for the sequences of FIGS. 8A, 8B, and 8C.

Figure 1:
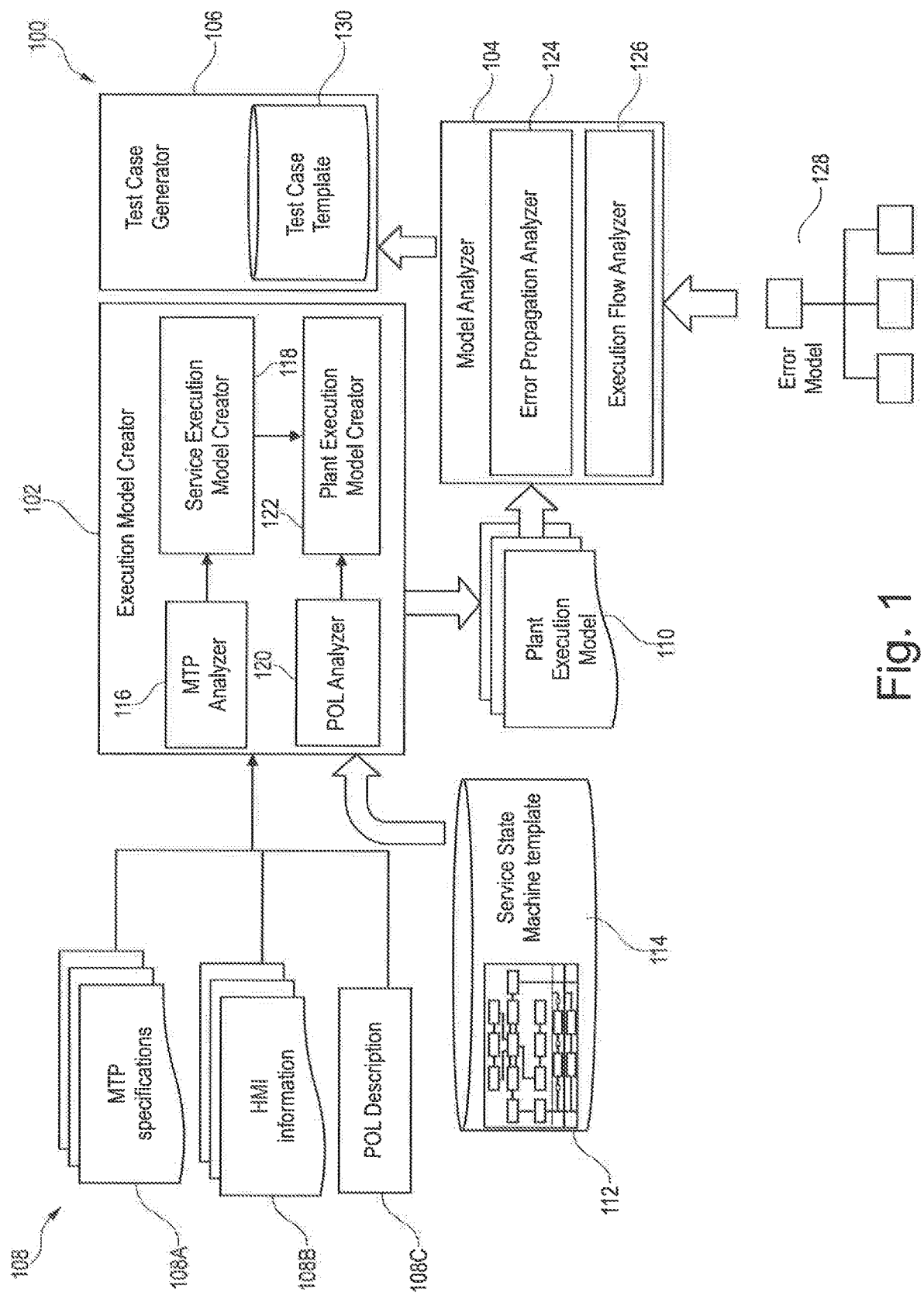
FIG. 1 is a diagram for a modular plant verification system according to the present disclosure.
Figure 13:
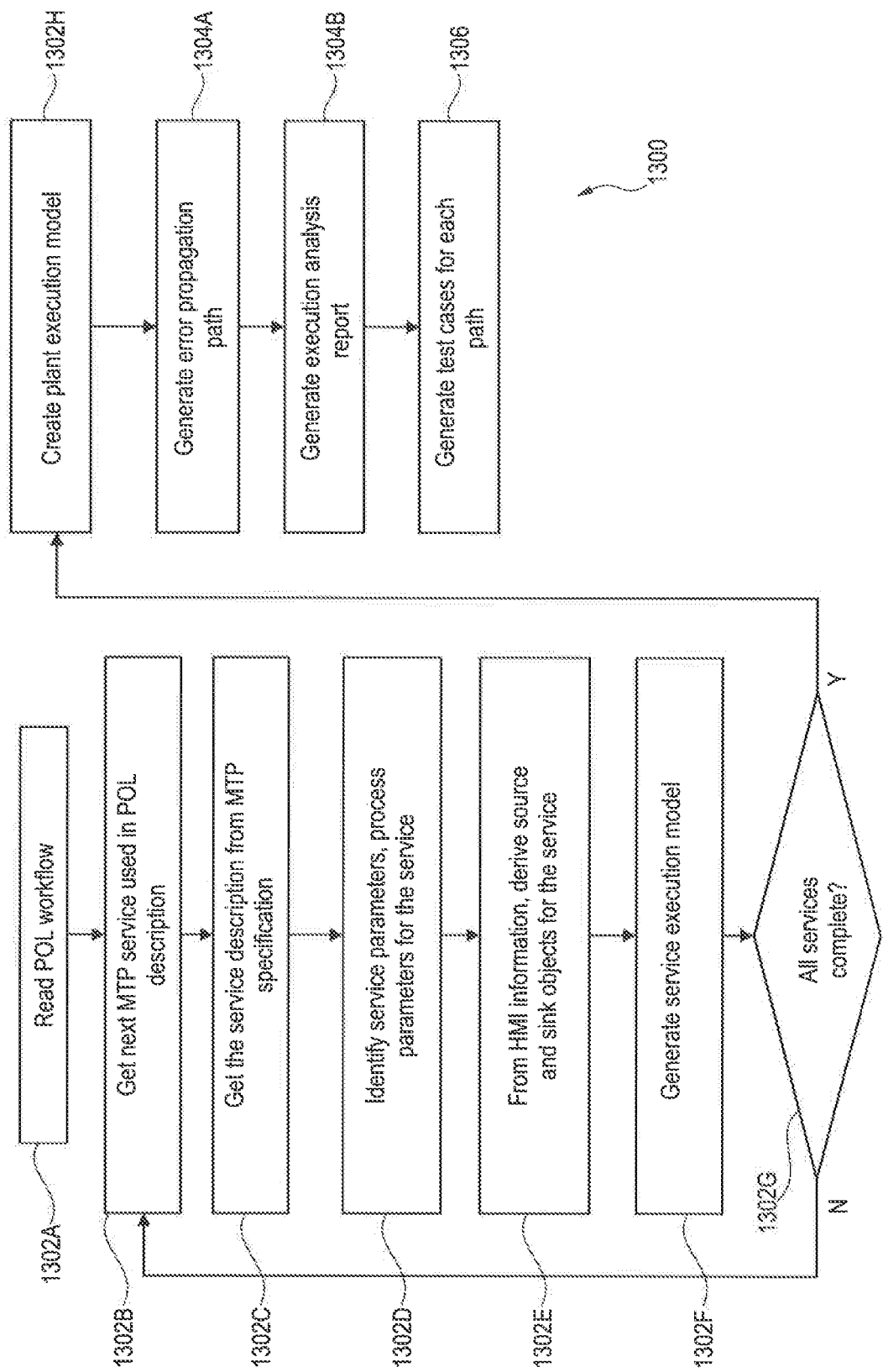

FIG. 13 is a flowchart for a modular plant verification method performed by the system of FIG. 1.

Figure 14:
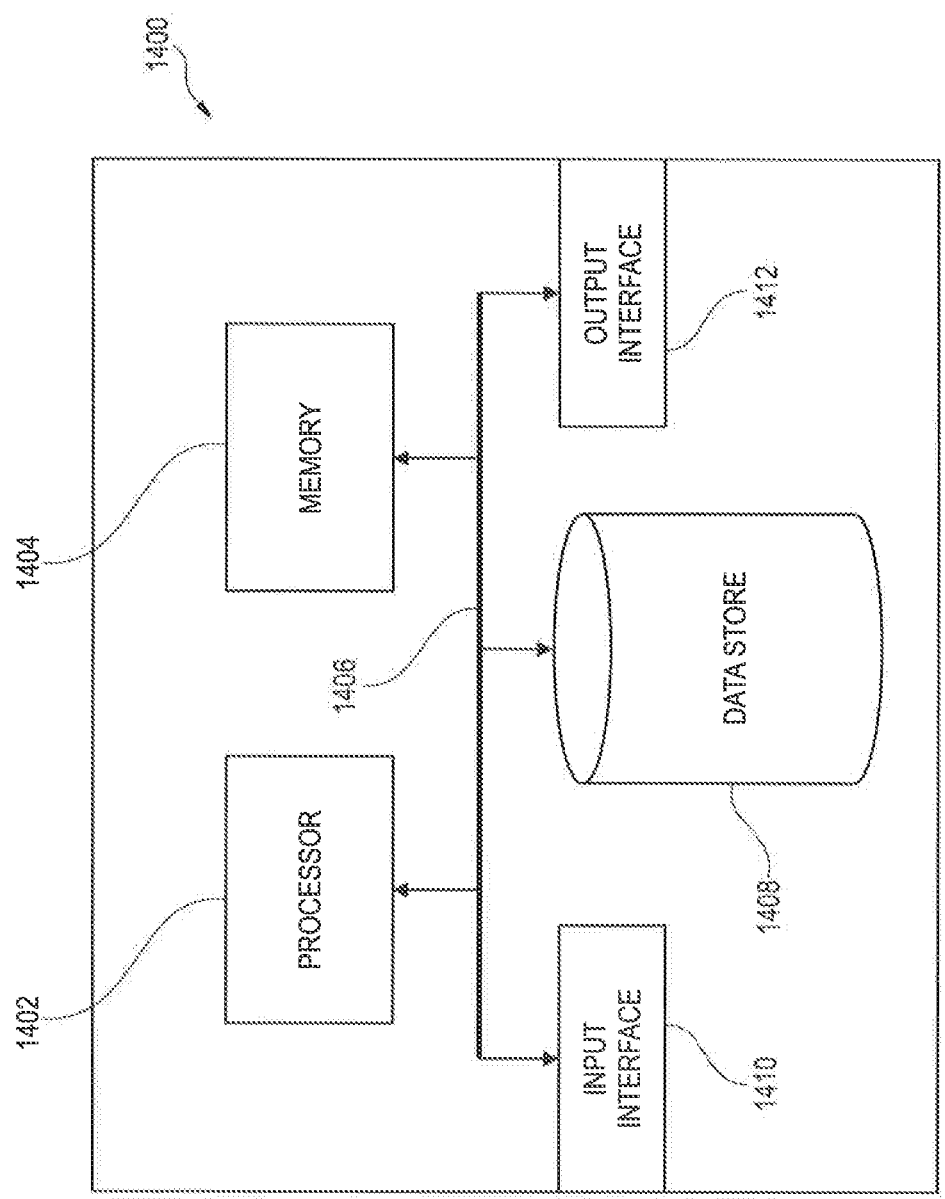

FIG. 14 is a diagram of a computing device that can be used in accordance with the systems and methods disclosed herein.

DETAILED DESCRIPTION OF THE INVENTION

Referring to FIG. 1, the modular plant verification system 100 according to the present disclosure comprises an execution model creator 102, a model analyzer 104, and a test case generator 106.

The execution model creator 102 is configured to obtain data 108 defining a modular plant and, using that data 108, to generate a plant execution model 110 for the modular plant. The execution model creator 102 may be configured to obtain one or more predefined service model templates 112. The execution model creator 102 comprises an MTP analyzer 116, a service execution model creator 118, a POL analyzer 120, and a plant execution model creator 122.

The data 108 defining the modular plant comprises one or more of: an MTP specification 108A for each module to be used by the modular plant; HMI information 108B including the plant topology; and a POL description 108C describing the process orchestration logic to be used by the modular plant. The data 108 may be provided by the engineering team responsible for designing the modular plant.

Figure 2:
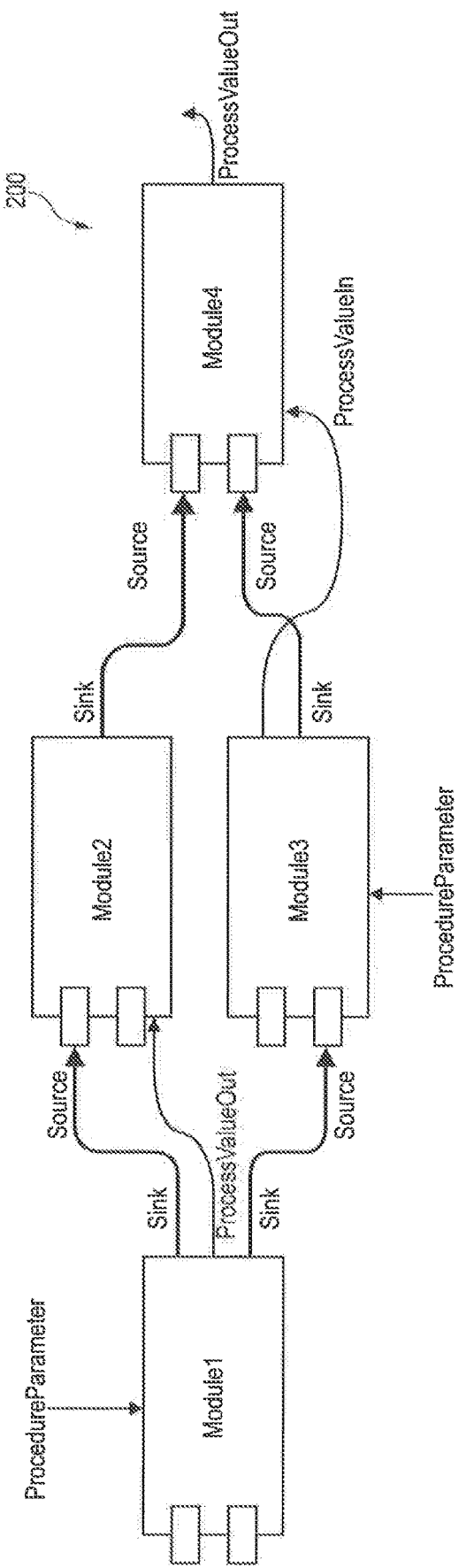
FIG. 2 is a diagram of a modular plant topology in accordance with the disclosure.

The plant designer typically designs the plant topology as a composition of a set of modules, such as the non-limiting example of plant topology 200 shown in FIG. 2, involving modules Module1-Module4. Sink objects are connected to source objects to define the flow of material and the flow of information in the form of the exchange of process values between modules is also defined. It will be understood that the type names shown in FIG. 2 are taken from AutomationML and that this is not intended to be limiting. Each module 201-204 has a set of source (input) and sink (output) objects as specified in its public MTP specification 108A, e.g. in the P&ID for the module. Each module 201-204 has a set of services and the process orchestration logic serves to orchestrate these services so as to produce an end product according to a particular recipe.

While the implementation details of a service may be unknown to the plant designer, an execution model of the service may be available in the form of a state machine provided as part of the MTP specification 108A. The MTP specification 108A also defines a set of control signals to monitor the state of the service and to instruct the service to change state. Although the plant designer may not be aware of how a particular service is implemented, the designer is assured that its execution will conform to the state machine and the designer can observe and control the execution state.

The MTP analyzer 116 reads the POL description 108C and, for each service used in the recipe: extracts the service description from the corresponding MTP specification 108A; identifies objects referred to in the service description, for example service parameters, process parameters, and events; derives source and sink objects used by the service from the HMI information 108B and/or from the P&ID in the MTP specification 108A; and instantiates a service execution model using the service execution model template 112.

The service execution model creator 118 receives the data provided by the MTP analyzer 116 and uses that data to generate a service execution model for each service used in the recipe. The service execution model creator 118 may generate each service execution model by modifying the corresponding instance of the service execution model template 112 using the relevant data provided by the MTP analyzer 116.

Figure 3:
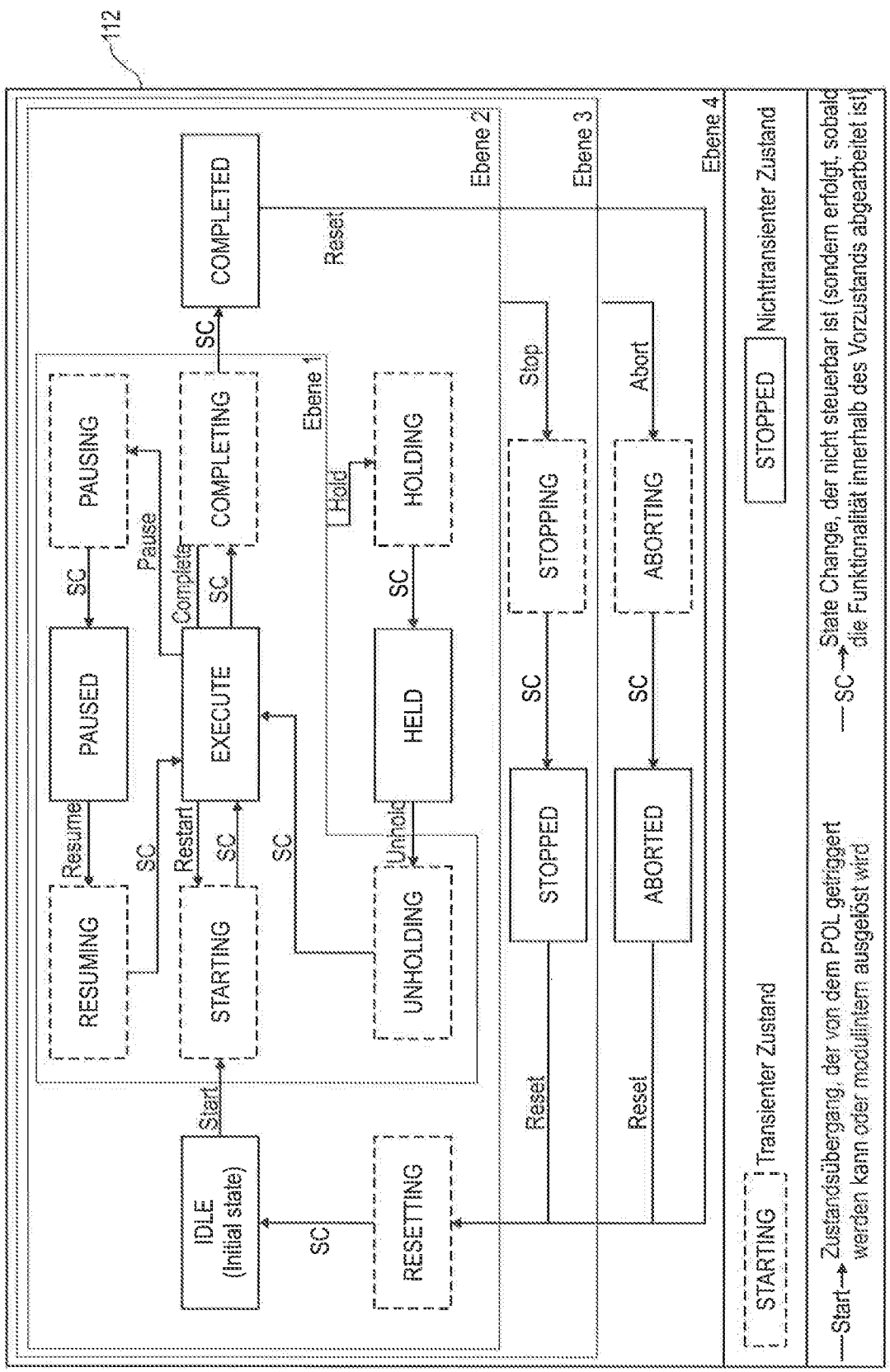
FIG. 3 is a diagram of a standard state machine template for modelling a module service in accordance with the disclosure.

FIG. 3 depicts the service execution model template 112 in more detail, which in this non-limiting example is a service state machine template. This template may conform to a standardized state machine definition which every service of a module is expected to follow. Thus, the service execution model creator 118 in this example is configured to model each service used in the recipe as a state machine. The state machine template 112 comprises a set of states and a set of state changes. The state changes include those which can be carried out on command ("Start", "Stop", etc.), and those (labelled "SC") which are effected in response to one or more process-specific conditions becoming true. To modify the service state machine template 112 so as to model a particular service, transition functions (transition logic) for the state changes labelled SC in the state machine template 112 may be defined, while retaining the overall structure of the state machine (that is, its states and the predefined state changes). The transition functions may be modified to model the particular service based on the objects identified by the MTP analyzer 116 as appearing in the service description for the service.

More particularly, a state transition function can be defined as

where conditions and actions can be defined using the objects identified in the service description. For example, a condition can be defined using "Event", "Source", "ProcedureParameter" and "ProcessValueIn", and an action can be defined using "Sink", "ProcessValueOut". Again, it is to be understood that the use of AutomationML in the present disclosure is not intended to be limiting. Since the modelling of error transitions is the primary interest, the service execution model creator 118 may be configured to define one or more specific transition functions related for example to one or more of the following state changes: Transient (from EXECUTE to HELD); Abort (from HELD to ABORTED); Abort (from EXECUTE to ABORTED); Recover (from HELD to EXECUTE); and Restart (from ABORTED to RESETTING). For instance, the service execution model 118 may create a transition function such as

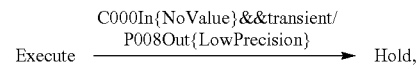

indicating the state change from EXECUTE to HELD happens on the condition that the process parameter C000In (obtained from the MTP description) has no value and the event "transient" is activated, with the transition generating the event P008Out{LowPrecision}. This process is repeated for all the services described in the POL description 108C. The template 112 is associated with a set of default events such as "Start", "Hold", "Abort", and so on, as shown in FIG. 3. To adapt the template to the particular service, the template may be modified to include any further events that appear in the service description.

The POL analyzer 120 reads the HMI information 108B and the POL description 108C and derives data defining communication between modules, for example the flow of material between modules and flow of information between modules. To this end, the POL analyzer 120 may employ one or more communication information functions which map communications between modules, as will now be explained.

The POL analyzer 120 may derive the data defining material flow from the plant topology in the HMI information 108B, which indicates how outputs of modules are connected to the inputs of other modules. For example, referring to the plant topology 200 shown in FIG. 2, hereinafter referred to as Example 1, the "Sink" object of Module1 is connected to the "Source" object of Module2. To derive this data, the POL analyzer may use a mapping function which models connections from sink objects to source objects in the plant topology. For example, the mapping function may take the form $\text{FlowMap}_{ij}:\text{Sink}_i \rightarrow \text{Source}_j$, which models a connection from a sink object of module i to a source object of module j.

The POL analyzer 120 may derive the data defining information flow from the POL description 108C, which indicates the exchange of e.g. process values between modules. For example, referring to the plant topology 200 of Example 1 as shown in FIG. 2, a ProcessValueOut object of Module1 is connected (via the process orchestration logic) to a ProcessValueIn object of Module2. To derive this data, the POL analyzer may use a mapping function which models connections from process value out objects to process value in objects in the process orchestration logic. For example, the mapping function may take the form $\text{ProcessValueMap}_{ij}: \text{ProcessValueOut}_i \rightarrow \text{ProcessValueIn}_j$, which models information flow from a process value out object of module i to a process value in object of module j.

The plant execution model creator 122 generates the plant execution model 110 by using the service execution models provided by the service execution model creator 118 to model the individual services used in the recipe, and by connecting the service execution models together using the data defining material flow and information flow provided by the POL analyzer 120.

Figure 4:
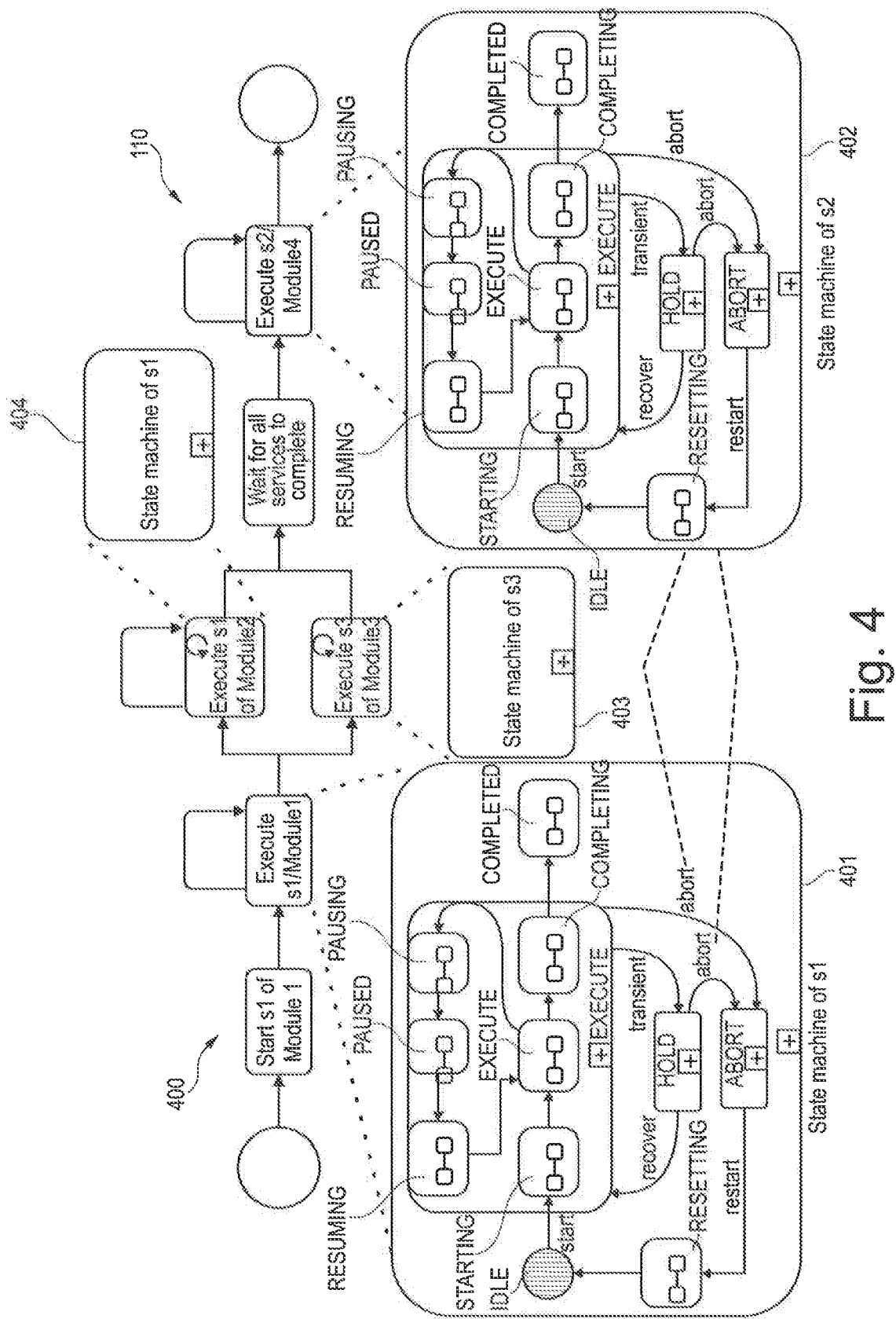
FIG. 4 is a diagram of a plant execution model for the plant topology shown in FIG. 2.

FIG. 4 illustrates one non-limiting example of a plant execution model 110, which in this case comprises a hierarchical state machine modelling the plant topology 200 of Example 1 shown in FIG. 2. The plant execution model 110 comprises a finite state machine 400 representing the process orchestration logic. This top-level state machine is created when the process orchestration logic is defined, or is readily derivable from the process orchestration logic, and represents the particular recipe which the plant is designed to carry out. As shown, the process orchestration logic begins by controlling the service sl of Modulel to enter the state "Start", and then "Execute", and so on. Each service is represented in a lower level by the corresponding state machine 401-404 generated by the service execution model creator 118. In this approach, the process orchestration is modelled as a state machine in which each state models the computation performed by the process orchestration layer as well as the execution of a service by a module.

Communication among modules (state machines) in terms of material flow and information flow is represented using the mappings identified by the POL analyzer 120.

Figure 6:
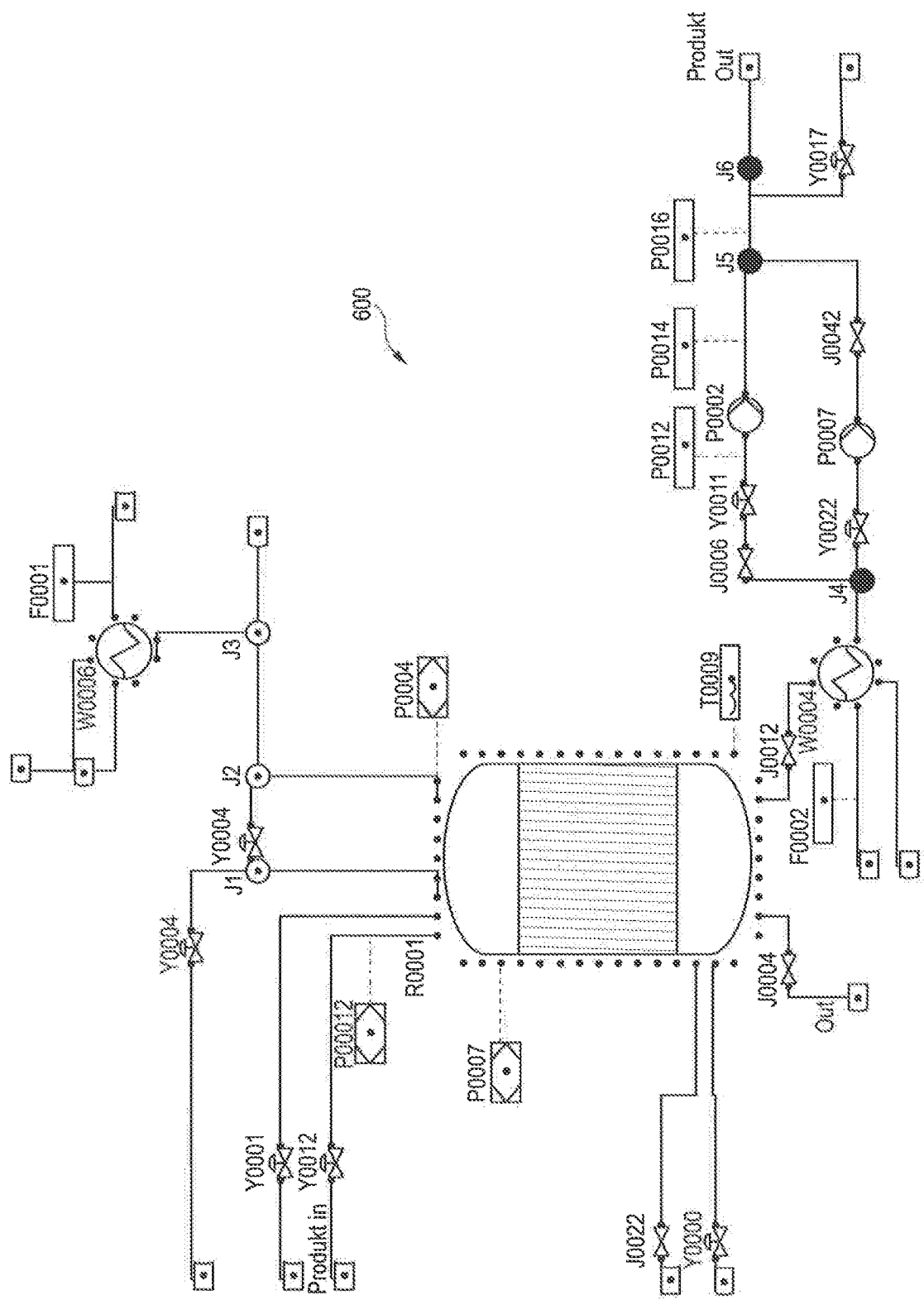
FIG. 6 is a schematic of a P&ID for the reactor module of FIG. 5.
Figure 7:
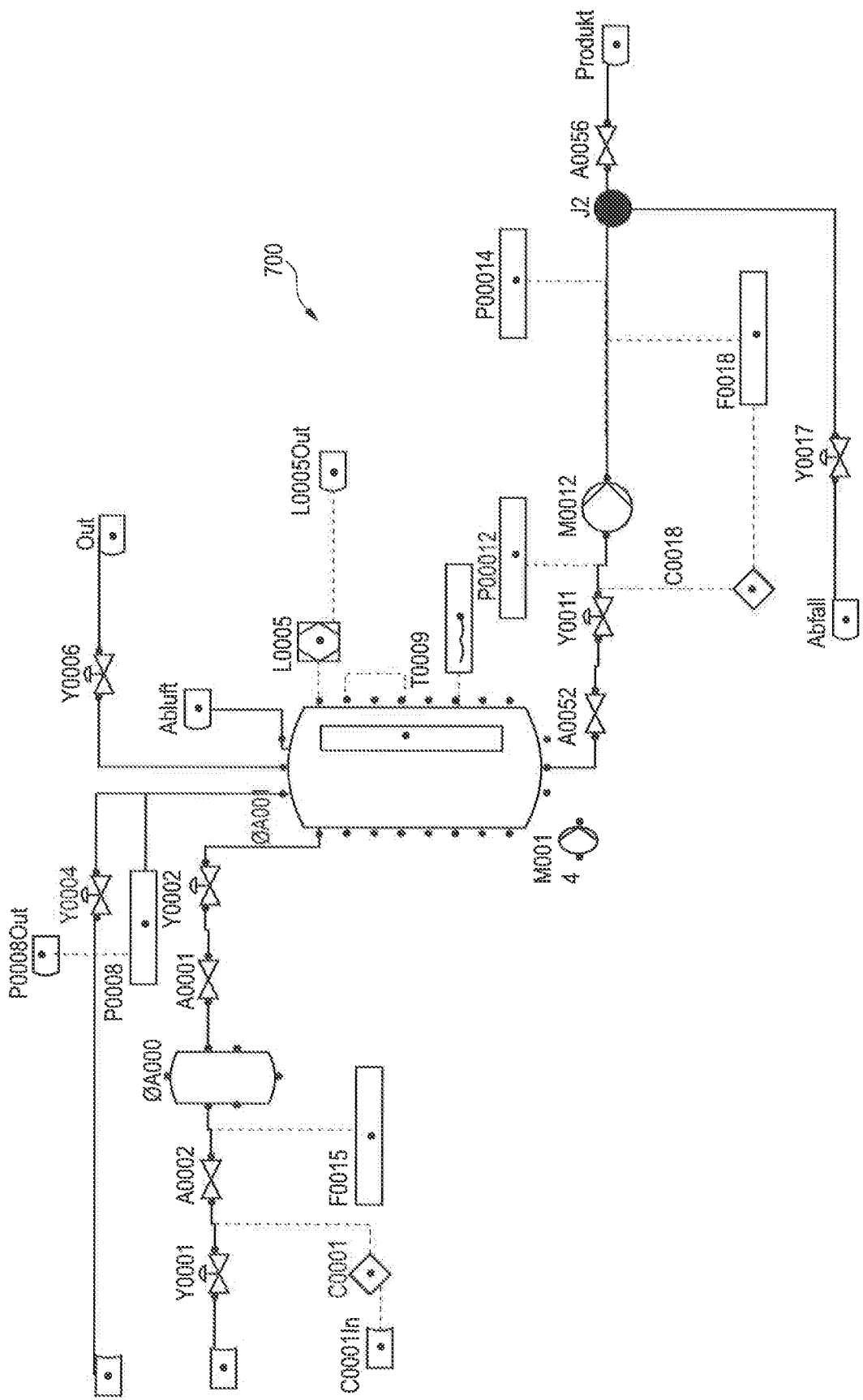
FIG. 7 is a schematic of a P&ID for the dosing modules of FIG. 5.

FIG. 5 illustrates one non-limiting example, hereinafter referred to as Example 2, of the topology of a modular plant 500 which uses three modules. The modules "Feederl" and "Feeder2" are dosing modules that are used as a dosing system for a reactor module, "Reactor", which can be used to mix and temper liquids and thereby invoke chemical reactions. The sink of each feeder module is connected to a source of the reactor module. These connections may be used for error propagation analysis, as described below. The MTP specifications 108A for the two module types—"RPXX" for the reactor module, and "BPXX" for the dosing modules—contain information defining the respective module services. FIG. 6 shows the P&ID 600 for the reactor module and FIG. 7 shows the P&ID 700 for the dosing modules. The P&ID diagrams of modules may provide source and sink information for the modules, to supplement that already available from the plant topology.

The dosing modules provide three services: "Filling", "Dosing" and "Discharging". The reactor module provides two services: "Mixing" and "Tempering". The modular plant 500 is operated to carry out a batch recipe 800, as shown in FIG. 8A. The batch recipe 800 begins with a startup sequence 802 and ends with a shutdown sequence 804. The startup 802 and shutdown 804 sequences are illustrated in more detail in FIGS. 8B and 8C, respectively. FIG. 9 shows a plant execution model 900 generated for the batch recipe 800 using the systems and methods as described herein, in a multistage process. In a first stage, top-level state machines representing the process orchestration logic for the sequences 802-806 are obtained, as described above. FIG. 10A shows the top-level state machine 1000 representing the batch recipe 800. FIG. 10B shows the top-level state machine 1002 representing the startup sequence 802.

The final state of the state machine 1002 for the startup sequence 802 comprises a transition to the starting state of the state machine 1000 for the batch recipe 800. A further top-level state machine (not shown) is obtained for the shutdown sequence 804, whose starting state similarly includes a transition from the final state of the state machine 1000 of the batch recipe 80. In a second stage, the top-level state machines 1000, 1002 are combined to produce the final, composite model 900 as shown in FIG. 9. As before, each state in a top-level state machine that corresponds to a service invocation is expanded in a lower level with the state machine modelling that service. As shown in FIG. 9, the incoming transition to the invoked service may be to the "IDLE" state in the corresponding state machine, while the outgoing transition may be from the "COMPLETED" state of that state machine.

Referring again to FIG. 1, the model analyzer 104 analyzes the plant execution model 110 to identify potential failure scenarios. In this example, the model analyzer 104 generates error propagation information and execution flow information, by way of an error propagation analyzer 124 and an execution flow analyzer 126, optionally with reference to an error model 128. The report of the analysis can be used to test the system against such unforeseen failures.

The error propagation analyzer 124 is configured to perform one or more error propagation analysis techniques on the plant execution model 110. In this example, the error propagation analyzer 124 is configured to perform material error propagation analysis and/or information error propagation analysis, using the above-described communication information functions, to model error propagation from one module to another. In this way, possible error propagation paths across multiple modules may be identified.

Material error propagation may be modelled as follows. A first transition function $$tr_i : p_i \xrightarrow{condition/si\{e\}} q_i,$$

where si is a Sink object of module i, propagates error e through the Sink object. A second transition function $$tr_j : p_j \xrightarrow{so\{e\}action} q_j,$$

where so is a Source object of module j, receives error e from the Source object. $tr_i$ is a state transition of some service in module i and $tr_j$ is another state transition of some service in module j. From the plant topology, a flowmap function is derived such that $FlowMap_{ij}(si)=so$. This indicates that the Sink object si of module i is connected to a Source object so of module j. The error propagation analysis propagates the error e generated from transition $tr_i$ in module i to module j and will trigger the transition $tr_j$ via si and so.

A similar information error propagation analysis may be performed for ProcessValueOut and ProcessValueIn. Moreover, it is conceived by the present disclosure that further such propagation models may be used in the analysis.

Error types for the error e may be predefined using the error model 128 obtained by the model analyzer 104. Examples of error types can include: InternalFault (when the service encounters a fault during execution causing it to halt or abort); LowPrecision (the service receives/sends data with low precision, e.g. via ProcessValueIn/ProcessValueOut); NoValue (the service does not provide any value through any process output); OutofRange (the value generated is outside the prescribed range); StreamingError (there are errors related to data streamed in or out), and NoService. The error types are preferably, but not essentially, generic. The error model 128 can be implemented in various ways. One approach can be to create an ontology of various error types, or an error taxonomy, which the model analyzer 104 can consult when generating the error transitions. In one non-limiting example, the error taxonomy may be as follows:

TABLE 1

| Type | Element | Description | Associated With |
| --- | --- | --- | --- |
| Value | NoValue | There is no output | Source, Sink, ProcessValueIn, ProcessValueOut Objects |
| | LowValue | The output is lower than the permissible range | |
| | HighValue | The output is higher than the permissible | |

TABLE 1-continued

| Type | Element | Description | Associated With |
|------|---------|-------------|-----------------|
| Timing | Early | range Arrives before the expected time | ProcessValueIn, ProcessValueOut Objects |
|  | Late | Arrives after the expected time |  |
| Service | NoService | Service stops | "Execute" State |
| Recoverability | InternalFault | The error is not detectable externally | "Execute" State |
|  | OutOfTolerance | The error occurs as the tolerance level is crossed | "Execute" State |
| Permanence | Transient | Sudden unpredictable error, which can go away with time | "Execute" State |
|  | Permanent | Fault in the system causing consistent error | "Execute" State |

Note that Table 1 presents a generic error taxonomy. The last column ("Associated With") may be instantiated (by e.g. the service execution model creator 118) with appropriate values of objects taken the service description in the MTP specification 108A. Subsequently, it can generate a set of error transitions for a service.

A generalized state transition for error (i.e., an error transition) can be defined as:

$$S_i \xrightarrow{condition\{Error\}/action\{Error\}} S_j.$$

In the above-described Example 2, a Source object of a feeder module may receive "Nitrogen" and produce at the Sink object "Product". ProcessValueIn may be "C000In", and ProcessValueOut "P008Out". For the dosing service, ProcedureParameter may be "SPFlow". For the dosing state machine;

$$Execute \xrightarrow{C000In\{NoValue\}\&\&transient/P008Out\{LowPrecision\}} Hold$$

The above models the following error scenario: from the "Execute" state, the module can go to the "Hold" state if the ProcessValueIn object C000In gets no value (from outside) and the event "transient" is activated. When it goes to the Hold state, the module propagates an error "LowPrecision" through ProcessValueOut object P008Out. If another module consumes this service and reads P008Out, it will receive the "LowPrecision" value.

In another example of an error transition for Example 2, $$Execute \xrightarrow{abort\{InternalFault\}/P008Out\{NoValue\}\&\&Product\{NoService\}} Abort$$

models the following error scenario: from the "Execute" state, if there is an "abort" event with the error "InternalFault", then the service goes to the "Abort" state, where the ProcessValueOut object N005Out propagates the "NoValue" error AND the sink object "Product" propagates the "NoService" error. If this Sink object is connected to a Source object of another module, the "NoService" error is propagated to that other module.

Yet another error scenario can be modelled by:

$$Execute \xrightarrow{Nitrogen\{NoValue\}||Nitrogen\{NoService\}/P008Out\{NoValue\}\&\&Product\{NoService\}} Abort.$$

This error transition implies that if the Source object "Nitrogen" receive the "NoValue" or "NoService" error (this models the fact that there is no material flow through this source to the module), then the service goes to the "Abort" state, where the ProcessValueOut object P008Out propagates the "NoValue" error AND the sink object "Product" propagates the "NoService" error. If this Sink object is connected to a Source object of another module, the "NoService" error is propagated to that other module.

The execution flow analyzer 126 is configured to perform one or more execution flow analysis techniques on the plant execution model 110, for example to identify failure scenarios relating to global reachability (reachability of a global safe/end state) or deadlocks. Execution flow analysis techniques may be used to identify execution sequences (of inputs, events, and so on) that lead to the final state of the computation, and/or execution sequences that lead to non-final states. Suitable techniques include for example those available at https://uppaal.org/, which is an open-source verification tool that can analyse the behaviour of a state machine or a collection of state machines and perform reachability analysis and execution flow analysis, and at https://verum.com/discover-dezyne/, which is another exemplary tool that can perform verification of a software system.

The model analyzer 104 may be further configured to define error probabilities associated with each error transition. For instance, the model analyzer 104 may be configured to use a default template associated with the publicly-available state machine model template 112 to assign predefined error transition probabilities. Note that the template 112 specifies the following error transitions: Execute Held, and Execute Aborting. For each error transition, multiple instances may be generated based on the ProcessValue, Source and Sink objects. For instance, the system can generate error transition instances such as:

1. Execute $\xrightarrow{C000In\{NoValue\}P008Out\{LowPrecision\}Produkt\{None\}}$ Hold 2. Execute $\xrightarrow{transient/P008Out\{LowPrecision\}Produkt\{LowValue\}}$ Hold for e.g. the BPXX1.Dosing service mentioned in the above-described Example 2. For each error transition instance, the default approach may be to assign a fixed probability value, which may be supplied automatically by the model analyzer 104.

Yet another approach may be to assign a random probability value using a set of random probability values based on a set of probability distributions. These distributions can be: Poisson; exponential; normal; Weibull. The model analyzer 104 may assist the user to select, say, an exponential distribution with the transition instance (Execute $\xrightarrow{transient/P008Out\{LowPrecision\}Produkt\{LowValue\}}$ Hold), referring again to Example 2. The user then chooses the probability of occurrence of the event "transient" to be exponential with a user-defined probability parameter of occurrence rate. In such a case, the model analyzer 104 may randomly assign a probability value drawn from the exponential distribution while computing the error propagation.

Referring again to FIG. 1, the test case generator 106 automatically generates one or more test cases for each failure scenario identified by the model analyzer 104, for example for each error propagation path. The test cases may be automatically executed to test and verify the performance of the process orchestration logic in the generated test cases. Test cases may be generated based on one or more test case templates 130. With this approach the system integrators can test various failure scenarios statically without having to run or simulate the behaviour of the system or modules. For each error propagation flow, the test case generator 106 may generate a failure test case and one or more recovery test cases. In the above-described Example 2, involving the module Feeder1 or Feeder2 (of type BPXX1) which is connected to the Reactor module (of type RPXX), as shown in FIG. 5, the connection BPXX1.Produkt→RPXX.ProduktIn is identified by the execution model creator 102. The error transition generated by the model analyzer 104 may be

for the BPXX1.Dosing service. With the connection information BPXX1.Produkt→RPXX.ProduktIn, the error transition may cause propagation of the error to RPXX, i.e. the "None" value of "Produkt" will be propagated to RPXX.ProduktIn. This will cause another error transition to be satisfied for the RPXX.Temper service, which will result in the "None" value appearing in RPXX.ProduktOut (as per the error transition in RPXX.Temper). This error propagation path is used to generate a test case which the tester can use during testing. The test case is shown in Table 2 below as test case 1.

TABLE 2

| Test Case | Test Data | Expected Result |
|---|---|---|
| 1 | BPXX1.C000In = NoValue | {BPXX1.Produkt = None, BPXX1.P008Out = Lowprecision}→RPXX.ProduktIn = None→ RPXX.ProduktOut = None |
| 1.1 | BPXX1.recovery | {BPXX1.Produkt = Value, BPXX1.P008Out = Value} |
| 1.2 | RPXX.recovery | RPXX.ProduktOut = Value |

With the error transition, the BPXX1.Dosing service may transition to the "HELD" state. From there, the recovery action may cause the BPXX1.Dosing service to transition back to its EXECUTE state. Similarly, from the HELD state, a separate recovery action causes RPXX.Temper to transition to its own EXECUTE state. These two recovery scenarios become two separate test cases (test cases 1.1 and 1.2).

Although the above disclosure relates to the use of state machines to model service and plant execution, it will be understood that the present disclosure is not so limited and that other models may be used instead. For example, FIG. 11 illustrates a petrinet model template 1100 for modelling a module service, which can be used as the service execution model template 112. FIG. 12 illustrates a petrinet-based plant execution model 1200, illustrating how the state machine-based plant execution model 900 of FIG. 9 would appear using petrinet as the modelling technique. Petrinet provides a more general-purpose transition system than finite state machines, in which a "place" models a computation state, and a transition models a change of states. The execution is modelled by placing a token inside a place. A guard condition associated with a transition can be used to control the firing of a transition. A guard condition may model the arrival of an event. A petrinet modelling a service can be associated with a place in a petrinet modelling the process orchestration. Instead of a simple petrinet, a stochastic petrinet may be used, in which transitions fire after a probabilistic delay determined by a random variable. A probabilistic delay associated with the "Execute" state can model the time it takes to perform execution.

FIG. 13 illustrates a modular plant verification method 1300 performed by the system of FIG. 1. The method comprises, in steps 1302A-1302H, by the execution model creator 102, generating the plant execution model 110 representing the process orchestration logic. In steps 1304A and 1304B, the method comprises, by the model analyzer 104, analyzing the plant execution model 110 to identify one or more potential failure scenarios. In step 1306, the method comprises, by the test case generator 106, generating one or more test cases based on the one or more identified failure scenarios. Non-limiting examples of sub-steps of the method are illustrated in FIG. 13.

Referring now to FIG. 14, a high-level illustration of an exemplary computing device 1400 that can be used in accordance with the systems and methods disclosed herein is illustrated. The computing device 1400 may form part of or comprise any desktop, laptop, server, or cloud-based computing device. The computing device 1400 includes at least one processor 1402 that executes instructions that are stored in a memory 1404. The instructions may be, for instance, instructions for implementing functionality described as being carried out by one or more components discussed above or instructions for implementing one or more of the methods described above. The processor 1402 may access the memory 1404 by way of a system bus 1406. In addition to storing executable instructions, the memory 1404 may also store conversational inputs, scores assigned to the conversational inputs, etc.

The computing device 1400 additionally includes a data store 1408 that is accessible by the processor 1402 by way of the system bus 1406. The data store 1408 may include executable instructions, log data, etc. The computing device 1400 also includes an input interface 1410 that allows external devices to communicate with the computing device 1400. For instance, the input interface 1410 may be used to receive instructions from an external computer device, from a user, etc. The computing device 1400 also includes an output interface 1412 that interfaces the computing device 1400 with one or more external devices. For example, the computing device 1400 may display text, images, etc. by way of the output interface 1412.

It is contemplated that the external devices that communicate with the computing device 1400 via the input interface 1410 and the output interface 1412 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1400 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1400 may be a distributed system. Thus, for instance, several devices may be in communication by way of a network connection and may collectively perform tasks described as being performed by the computing device 1400.

Various functions described herein can be implemented in hardware, software, or any combination thereof. If implemented in software, the functions can be stored on or transmitted over as one or more instructions or code on a computer-readable medium. Computer-readable media include computer-readable storage media. Computer-readable storage media can be any available storage media that can be accessed by a computer. By way of example, and not limitation, such computer-readable storage media can comprise FLASH storage media, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers.

Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may include any such individual feature or combination of features.

It has to be noted that embodiments of the invention are described with reference to different categories. In particular, some examples are described with reference to methods whereas others are described with reference to apparatus. However, a person skilled in the art will gather from the description that, unless otherwise notified, in addition to any combination of features belonging to one category, also any combination between features relating to different category is considered to be disclosed by this application. However, all features can be combined to provide synergetic effects that are more than the simple summation of the features.

While the invention has been illustrated and described in detail in the drawings and foregoing description, such illustration and description are to be considered exemplary and not restrictive. The invention is not limited to the disclosed embodiments. Other variations to the disclosed embodiments can be understood and effected by those skilled in the art, from a study of the drawings, the disclosure, and the appended claims.

The word "comprising" does not exclude other elements or steps.

The indefinite article "a" or "an" does not exclude a plurality. In addition, the articles "a" and "an" as used herein should generally be construed to mean "one or more" unless specified otherwise or clear from the context to be directed to a singular form.

A single processor or other unit may fulfil the functions of several items recited in the claims.

The mere fact that certain measures are recited in mutually different dependent claims does not indicate that a combination of these measures cannot be used advantageously.

A computer program may be stored/distributed on a suitable medium, such as an optical storage medium or a solid-state medium supplied together with or as part of other hardware, but may also be distributed in other forms, such as via the internet or other wired or wireless communications systems.

Any reference signs in the claims should not be construed as limiting the scope.

Unless specified otherwise, or clear from the context, the phrases "one or more of A, B and C", "at least one of A, B, and C", and "A, B and/or C" as used herein are intended to mean all possible permutations of one or more of the listed items. That is, the phrase "X comprises A and/or B" is satisfied by any of the following instances: X comprises A; X comprises B; or X comprises both A and B.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for verifying process orchestration logic for a modular plant, the method comprising:
    generating a plant execution model representing the process orchestration logic for one or more control modules preforming services referenced in the process verification logic, the plant execution model comprising one or more service execution models representing services performed by the control modules, the plant execution model further comprising modeling communications between a first service execution model connected with a second service execution model;
    analyzing the plant execution model to identify one or more potential failure scenarios by analyzing error propagation communicated between the first and second service execution models; and
    generating one or more test cases based on the one or more identified failure scenarios,
    wherein the error propagation communicated between the first and second service execution models is an error transition associated with a state transition of the first and second service execution models.

2. The method of claim 1, wherein obtaining the service execution models comprises generating the service execution models by modifying at least one template service execution model based on data defining the modular plant.

3. The method of claim 2, wherein modifying the template service execution model comprises modifying state transition conditions in the template service execution model based on the data defining the modular plant.

4. The method of claim 1, wherein modelling communications between the services comprises modelling one or more of material flow and information flow between the services.

5. The method of claim 4, wherein identifying material flow comprises identifying connections between sink objects and source objects in the data defining the plant topology.

6. The method of claim 4, wherein identifying information flow comprises identifying connections between output and input of process values in the process orchestration logic.

7. The method of claim 1, wherein the plant execution model comprises a hierarchical plant execution model, in which an upper hierarchy represents the process orchestration logic and a lower hierarchy represents service execution.

8. The method of claim 1, wherein generating the plant execution model comprises a multistage process in which a main sequence is modelled in one stage and one or more sub-sequences are modelled in one or more other stages.

9. The method of claim 1, wherein the plant execution model is implemented using one or more of: state machines; petrinets; stochastic petrinets; stochastic activity networks; or any combination thereof.

10. The method of claim 1, wherein analyzing the plant execution model comprises performing one or more error propagation analysis techniques.

11. The method of claim 1, wherein analyzing the plant execution model comprises performing one or more execution flow analysis techniques.

12. The method of claim 1, wherein analyzing the plant execution model is performed with reference to an error model comprising one or more predefined error types.

* * * * *